UNITED STATES PATENT OFFICE.

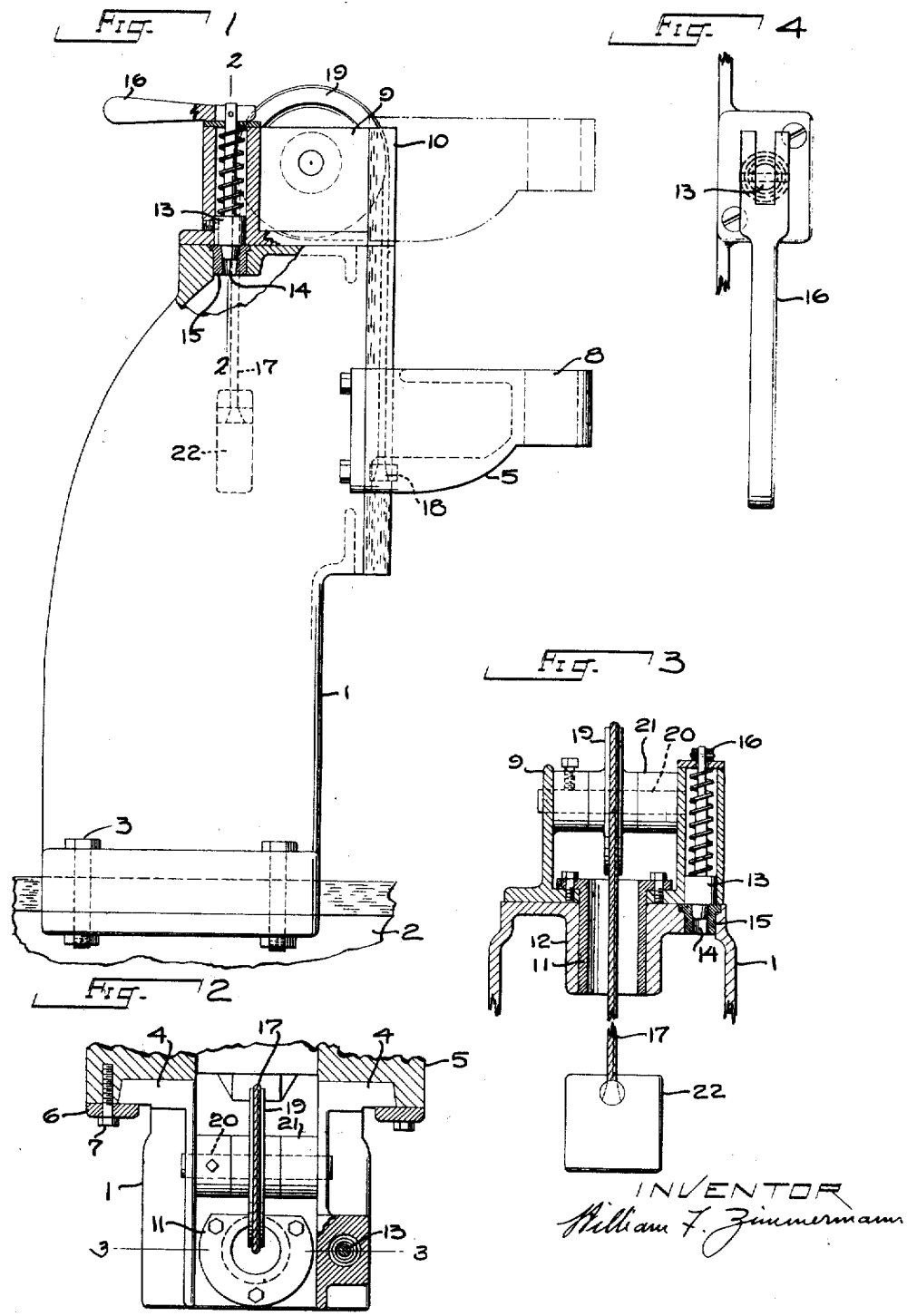

WILLIAM F. ZIMMERMANN, OF NEWARK, NEW JERSEY, ASSIGNOR TO GOULD & EBERHARDT, OF NEWARK, NEW JERSEY, A CORPORATION OF NEW JERSEY.

SPINDLE-SUPPORTING MEMBER.

1,304,643.  Specification of Letters Patent.  Patented May 27, 1919.

Application filed June 2, 1917. Serial No. 172,489.

*To all whom it may concern:*

Be it known that I, WILLIAM F. ZIMMERMANN, a citizen of the United States, and a resident of Newark, in the county of Essex and State of New Jersey, have invented certain new and useful Improvements in Spindle-Supporting Members, and do hereby declare the following specification, taken in connection with the drawings forming part of same, to be a full, clear, concise, and exact description of the invention and the best mode contemplated to apply the principle thereof, so as to distinguish it from other inventions and to enable any person skilled in the art to which it appertains or with which it is most nearly connected to make, construct, and use the same.

This invention relates primarily to machines in which a cutter or work spindle is provided with an end support bearing, and more particularly to a milling and gear cutting machine.

Machines that require a spindle support have heretofore been arranged with means, for supporting the outer end of the cutter or work spindle, in the form of a cylindrical member adjustably secured to a part of the machine and a spindle bearing circumscribing said cylinder. In such a construction the bearing member was generally arranged to be moved longitudinally and to be swiveled about said cylindrical member. Means were also provided to clamp said bearing member in any position on the cylinder. This cylindrical form of spindle support was found inadequate to resist the stresses produced by cutting tools operated under modern conditions.

To better resist the severe stresses, a column or box type of spindle support was produced which is usually provided with a dove-tail or a rectangular guide-way for a bearing member which can be clamped in different positions on said column. The great disadvantage of this column or box type of spindle support lies in the fact that the bearing member must be entirely removed when it is desired to remove the cutters or work from the spindle.

The removal of the bearing member was not necessary in the cylindrical type of support because the bearing could be swiveled and secured in a position which did not interfere with the removal of the work or cutters. The swivel feature resulted in an extended use of the cylindrical type of support.

The primary object of this invention is to include in one construction, the rigidity of the column or box type of spindle support and the adaptability of the cylindrical type of spindle support.

Other objects will be apparent from, and are incorporated in the annexed drawings, and in the following description, which sets forth in detail, certain contrivances embodying means, constituting however, but one of the various mechanical forms in which the principle of the invention may be used.

The novelty of the invention will be readily understood from the drawings, which show a construction for practising the invention in its preferred form, and from the following description thereof, and is more specifically pointed out and distinctly claimed in the claims annexed to said description.

In the drawings:—

Figure 1 is a side elevation of the invention for supporting a vertical spindle.

Fig. 2 is a plan view with a fragmentary section of the bearing member.

Fig. 3 is a sectional view at 2—2 of Fig. 1 and 3—3 of Fig. 2.

Fig. 4 is a plan view of a locking lever arrangement.

The drawings depict a construction primarily adapted to support the work spindle of a gear cutting machine. The principle involved, however, can be readily adapted to support the end of the cutter arbor on a milling machine. The column or supporting member 1, is secured to the frame 2 of the machine by means of the bolts 3. Guideways 4 are arranged upon the face of the column to accurately guide the bearing member 5, which member is provided with straps 6 and bolts 7, to secure the bearing member to the column. An opening 8 which is co-axial with the spindle to be supported, is provided in the bearing member 5, and can be arranged to support any part of the spindle.

The structure just described constitutes the usual type of column support for cutter or work spindles.

Continuing with the detailed description it will be noted from the drawing that at one end of the column 1, a supplemental or swivel member 9 is pivotally arranged and is provided with guide-ways 10, which are accurately in alinement with the guide-ways 4 on the column 1. A trunnion 11 secured to the swivel member 9 is revolubly mounted in the bearing 12 of column 1. The trunnion 11 can also be made integral with the swivel member 9, but for the convenience of manufacture it is shown in the drawings as a separate member. A spring actuated locking bolt 13 is provided in said swivel member 9, and is arranged to engage the conical opening 14 in the column. The conical opening 14 is provided in a bush 15 which is fitted to the column. A lever 16 is secured to the locking bolt 13 for the purpose of withdrawing said locking bolt from engagement with the column.

Assuming that the locking bolt 13 is in the operative position as shown in the drawings and the guide-ways 10 are in alinement with the guide-ways 4, then the bearing member 5 can be moved upward to the position shown in dot and dash in Fig. 1. The locking bolt can then be withdrawn and the bearing member 5 swiveled on its trunnion 11 so that said bearing member will not interfere with the removal of either the cutters or the work from the spindle which was supported.

A counterweight arrangement is also provided for the bearing member 5, which comprises a cable 17 secured at 18 to the bearing member 5. The cable passes over a sheave wheel 19 which is rotatably mounted on a shaft 20 secured in bearings 21 of the swiveling member 9. A counterweight 22 is attached to the other end of the cable and is approximately equal in weight to the bearing member.

From the drawings and description it will be apparent that the invention provides a very rigid supporting member in the form of a column or box type, and permits the bearing member to be readily moved to any position on the column and secured thereto to support the cutter or work spindle, or said bearing member can be swiveled to a position which will not interfere with the removal of the cutters or work.

The arrangement shown is readily adaptable to a milling or other machine by merely modifying the column to suit the member to which it is to be attached.

Having described my invention I claim as new and desire to secure by Letters Patent:

1. In combination, a box type supporting member, a bearing member adjustably mounted upon said supporting member, and means to swivel said bearing member into a none use position.

2. In combination, a box type supporting member, guide-ways upon said member, a bearing member adjustably arranged upon said member and provided with complementary guide-ways, and means to swivel said bearing members at right angles to said guideways into a none use position.

3. In combination, a box type supporting member having parts thereof pivotally arranged, a bearing member adjustably mounted upon said supporting member and means to swivel said bearing member and the pivotal portion of said supporting member into a none use position.

4. In combination, a box type supporting member, a supplemental member pivotally arranged upon said supporting member and a bearing member adjustably mounted upon said supporting member and coöperating with said supplemental member whereby said bearing member can be swung into a none use position.

5. In combination, a supporting member, guide-ways upon said member, a supplemental member pivotally arranged upon said supporting member and a bearing member adjustably mounted upon said supporting member and provided with complementary guide-ways and coöperating with said supplemental member whereby said bearing member can be moved into a none use position.

6. In combination, a supporting member, guide-ways upon said member, a supplemental member pivotally arranged upon said supporting member to swing in a plane at right angles to said guide-ways, and a bearing member adjustably arranged upon said supporting member and provided with complementary guide-ways and coöperating with said supplemental member whereby said bearing member can be moved into a none use position.

7. In combination, a supporting member, guide-ways upon said member, a supplemental member pivotally arranged upon said supporting member and provided with guide-ways in alinement with said guideways upon said supporting member, and a bearing member adjustably arranged upon said supporting member and provided with complementary guide-ways and coöperating with said supplemental member, whereby said bearing member can be swung into a none use position.

8. In combination, a box type supporting member, a supplemental member, pivotally arranged upon said member, a locking means to lock said supplemental and supporting member, a bearing member adjustably mounted upon said supporting member, coöperating with said supplemental member and means to unlock said supplemental member to permit said bearing member to be moved into a none use position.

9. In combination, a supporting member, guide-ways upon said member, a supplemental member pivotally arranged upon said supporting member, guide ways upon said supplemental member, means to lock said supplemental member to said supporting members to bring their respective guideways in alinement, a bearing member adjustably mounted on said supporting member and coöperating with said supplemental member, and means to unlock said supplemental member to permit said bearing member to be moved into a none use position.

10. In combination, a supporting member, a supplemental member pivotally arranged upon said member, a bearing member adjustably mounted upon said supporting member and arranged to coöperate with said supplemental member, and a counterbalance for said bearing member operative in any position of said bearing member.

11. In combination, a supporting member, a supplemental member, a pivotal connection between said supplemental and supporting members, a bearing member adjustably arranged upon said supporting member and coöperating with said supplemental member, and means coincident with the center of said pivotal connection to counterbalance said bearing member.

12. In combination, a supporting member, a supplemental member, a pivotal connection between said supplemental and supporting members, a bearing member adjustably mounted upon said supporting member and arranged to coöperate with said supplemental member whereby said bearing member can be moved into a none use position, a sheave wheel mounted in said supplemental member, a counterweight connected to said bearing member and passing over said sheave wheel and suspended in the pivotal axis of said pivotal connection between said supplemental and supporting members.

Signed this 31st day of May 1917.

WILLIAM F. ZIMMERMANN.

Copies of this patent may be obtained for five cents each, by addressing the "Commissioner of Patents, Washington, D. C."